(12) United States Patent
Ando et al.

(10) Patent No.: US 10,015,336 B2
(45) Date of Patent: Jul. 3, 2018

(54) IMAGE PROCESSING APPARATUS (71) Applicant: KYOCERA Document Solutions Inc., Osaka-shi, Osaka (JP)

(72) Inventors: Yoshihiro Ando, Osaka (JP); Saki Katayama, Osaka (JP); Masuo Kawamoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/445,825

(22) Filed: Feb. 28, 2017

(65) Prior Publication Data
US 2017/0289375 A1 Oct. 5, 2017

(30) Foreign Application Priority Data
Mar. 7, 2017 (JP) ................................ 2016-065674

(51) Int. Cl.
*H04N 1/04* (2006.01)
*H04N 1/00* (2006.01)
*H04N 1/12* (2006.01)
*H04N 1/193* (2006.01)

(52) U.S. Cl.
CPC ..... *H04N 1/00588* (2013.01); *H04N 1/00411* (2013.01); *H04N 1/00602* (2013.01); *H04N 1/1225* (2013.01); *H04N 1/193* (2013.01); *H04N 2201/0081* (2013.01)

(58) Field of Classification Search
CPC ............. H04N 1/00588; H04N 1/1225; H04N 1/00602; H04N 1/193
USPC .................................................. 358/498, 474
See application file for complete search history.

(56) References Cited

U.S. PATENT DOCUMENTS 6,587,233 B1 *  7/2003  Salgado ............. H04N 1/00551
358/474

FOREIGN PATENT DOCUMENTS

JP          05297665 A      11/1993
JP          1998-322482       * 12/1998 ............. H04N 11/04

* cited by examiner

*Primary Examiner* — Houshang Safaipour
(74) *Attorney, Agent, or Firm* — Alleman Hall Creasman & Tuttle LLP (57) ABSTRACT

An image processing apparatus includes a document table, an image reading portion, a cover portion, a presser sheet, and a sheet winding portion. The presser sheet is provided on the cover portion, and contacts the document on the document table when the cover portion is positioned at the closing position. The sheet winding portion allows a first portion of the presser sheet to extend along the document table while holding a second portion of the presser sheet in a wound state. The sheet winding portion can feed the second portion when an external force is applied to the first portion. In the cover portion, a retreat space is formed so that the first portion of the presser sheet and a portion of the second portion fed from the sheet winding portion can retreat into the retreat space.

8 Claims, 7 Drawing Sheets

IMAGE PROCESSING APPARATUS

INCORPORATION BY REFERENCE

This application is based upon and claims the benefit of priority from the corresponding Japanese Patent Application No. 2016-065674 filed on Mar. 29, 2016, the entire contents of which are incorporated herein by reference.

BACKGROUND

The present disclosure relates to an image processing apparatus.

In general, an image processing apparatus such as a scanner or a copier having a function to read an image from a document, includes a document table (platen glass) on which the document is placed, and a cover portion that covers the document table. The cover portion is pivotably supported so as to pivot between a closing position to cover the document table and an opening position to open a space on the document table.

In addition, a document conveying portion called ADF (Auto Document Feeder) is often provided in the cover portion. The document conveying portion conveys sheets of documents one by one from a supply tray formed on the cover portion to a discharge tray via a document conveyance path. In this case, an image reading portion can read an image from a document in a placement mode and a conveyance mode.

In the placement mode, an image is read from a document placed on the document table, and in the conveyance mode, an image is read from a document while the document is conveyed along the document conveyance path.

There is known an image processing apparatus including slide rails that can lift up and down a hinge portion of the cover portion. With this configuration, when a book document with a large thickness is placed on the document table, the cover portion, while extending horizontally, can hold the book document.

SUMMARY

An image processing apparatus according to an aspect of the present disclosure includes a document table, an image reading portion, a cover portion, a presser sheet, and a sheet winding portion. On the document table, a document is placed. The image reading portion reads an image from the document placed on the document table. The cover portion is supported in such a way as to pivot between a closing position to cover the document table and an opening position to open a space on the document table. The presser sheet has a belt-like shape, is provided on the cover portion, and contacts the document on the document table when the cover portion is positioned at the closing position. The sheet winding portion is provided on the cover portion, allowing a first portion to extend along the document table while holding a second portion in a wound state, and can feed the second portion when an external force is applied to the first portion, the first portion being a part of the presser sheet, the second portion being another part of the presser sheet including an end of the presser sheet. In the cover portion, a retreat space is formed so that the first portion of the presser sheet and a portion of the second portion fed from the sheet winding portion can retreat into the retreat space.

An image processing apparatus according to another aspect of the present disclosure includes the document table, the image reading portion, the cover portion, and a document pressing portion. The document pressing portion is provided on the cover portion and includes at least one panel portion that presses the document on the document table. The panel portion is supported by the cover portion to be at a reference position along the document table so that the panel portion can be displaced into a retreat space formed in the cover portion from the reference position when an external force is applied from the document table side.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

[First Embodiment]

Figure 1:
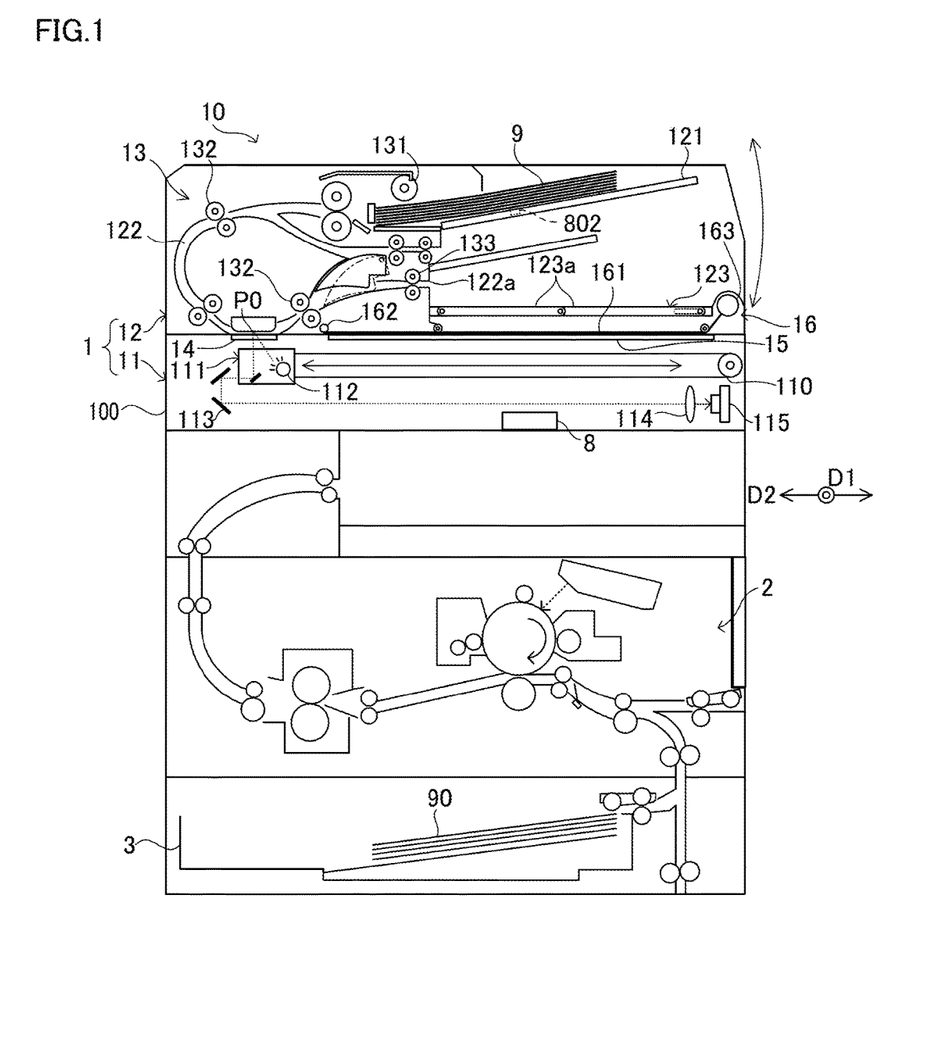
FIG. 1 is a configuration diagram of an image processing apparatus according to a first embodiment.
Figure 2:
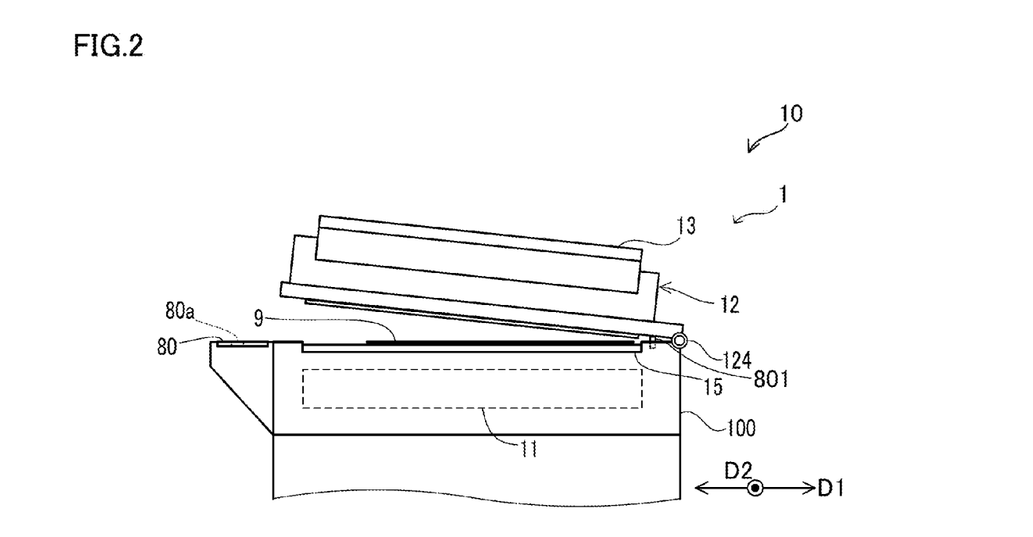
FIG. 2 is a configuration diagram of an image reading device of the image processing apparatus according to the first embodiment when a cover portion of the image reading device is about to be closed.

As shown in FIG. 1 and FIG. 2, an image processing apparatus 10 according to the first embodiment includes an image reading device 1, an image forming device 2, a control portion 8, and an operation/display portion 80. For example, the image processing apparatus 10 is a copier, a facsimile, or a multifunction peripheral.

The image reading device 1 includes an image reading portion 11, a transparent platen glass 15, a transparent contact glass 14, and a platen cover 12. An ADF (Auto Document Feeder) 13 is embedded in the platen cover 12.

The image processing apparatus 10 performs image processing of an image of a document 9 placed on the platen glass 15. The platen glass 15 is a document table on which the document 9 is placed, and is an upper surface of a main body portion 100 of the image reading portion 11.

The image processing includes an image reading process to read an image from the document 9, and further includes a process for processing or transporting data of the image read from the document 9, and a process for forming the image read from the document 9, onto a sheet 90.

As shown in FIG. 2, the platen cover 12 is pivotably supported by a hinge 124 provided on the main body portion 100 of the image reading device 1. The platen cover 12 can pivot between a closing position to cover the platen glass 15 from above, and an opening position to open a space on the platen glass 15. It is noted that the platen cover 12 is an example of the cover portion.

The platen cover 12 includes a supply tray 121, a document conveyance path 122, and a discharge tray 123. The ADF 13 conveys each document 9 from the supply tray 121 to the discharge tray 123 via the document conveyance path 122.

The ADF 13 includes a feed roller 131, a conveyance roller 132, and a discharge roller 133, wherein the feed roller 131 feeds the document 9 from the supply tray 121, the conveyance roller 132 conveys the document 9 along the document conveyance path 122, and the discharge roller 133 discharges the document 9 from an outlet 122a of the document conveyance path 122 onto the discharge tray 123. It is noted that the ADF 13 is an example of the document conveying portion.

The image reading portion 11 includes a plurality of mirrors 113, a moving unit 111, a movement mechanism 110, and an image sensor 115, wherein the moving unit 111 includes a light source 112 and a part of the plurality of mirrors 113.

The movement mechanism 110 causes the moving unit 111 to move along a sub scanning direction D2 perpendicular to a main scanning direction D1. The movement mechanism 110 causes the moving unit 111 to move along the platen glass 15.

Alternatively, the movement mechanism 110 can position the moving unit 111 at a position facing a reading position P0 on the contact glass 14 that is disposed on the extension line of the platen glass 15. The reading position P0 is included in the document conveyance path 122.

The light source 112 emits light from below the platen glass 15 to irradiate a line region extending on the platen glass 15 or the contact glass 14 along the main scanning direction D1. In FIG. 1, the main scanning direction D1 is a direction perpendicular to the plane of the figure.

Light is emitted from the light source 112 to the platen glass 15 or the contact glass 14, and reflection light from the document 9 placed on the platen glass 15 is guided by the mirrors 113 and a lens 114 to a light receiving portion of the image sensor 115.

The image sensor 115 is a sensor for detecting, for each pixel, a light amount of the reflection light reflected from the document 9. The image sensor 115 outputs the data of the detected light amount for each pixel, as image data D0.

The image sensor 115 shown in FIG. 1 is a CCD (Charge Coupled Device). It is noted that a contact image sensor (CIS) in which the light source 112, the lens 114 and the image sensor 115 are integrally formed, may be adopted. In this case, the moving unit 111 includes the CIS.

The image reading portion 11 can read a document image in a placement mode and in a conveyance mode, wherein in the placement mode, an image is read from a document 9 placed on the platen glass 15, and in the conveyance mode, an image is read from a document 9 conveyed along the document conveyance path 122. It is noted that the document image is an image formed on the document 9.

During the image reading process in the placement mode, the image reading portion 11 scans a light beam along the platen glass 15, receives reflection light, and outputs the image data D0 that corresponds to the light amount of the reflection light. The image data D0 is data of the document image.

In addition, during the image reading process in the conveyance mode, the ADF 13 conveys a document 9, and the image reading portion 11 irradiates light on the document 9 while the document 9 passes the reading position P0, receives reflection light, and outputs the image data D0 that corresponds to the light amount of the reflection light. With the image reading process, the image reading portion 11 reads the document image.

Furthermore, the image reading device 1 of the image processing apparatus 10 includes a cover sensor 801 and a document sensor 802.

The cover sensor 801 detects whether or not the platen cover 12 is present at the closing position (see FIG. 2). The document sensor 802 detects whether or not a document 9 is present on the supply tray 121. For example, each of the cover sensor 801 and the document sensor 802 may be a contact-type limit switch or a noncontact-type proximity switch.

The image forming device 2 can perform a copy process in which to form an image corresponding to the image data D0 obtained in the image reading process, on a sheet 90 supplied from a sheet supply portion 3. In addition, the image forming device 2 can execute a print job that is received from an external apparatus via a communication portion (not shown). The sheet 90 is a sheet-like image formation medium such as a sheet of paper or an envelope.

The image forming device 2 shown in FIG. 1 forms a toner image on the sheet 90 by the electrophotographic system. It is noted that the image forming device 2 may form an image on the sheet 90 by another system such as the inkjet system.

The operation/display portion 80 is a user interface device including: an operation portion that receives an operation for input of information; and a display portion that display information. The control portion 8 controls the operation/display portion 80 and other electric devices included in the image processing apparatus 10.

In the following description, a relatively thick document 9 such as a book or a pamphlet having a lot of pages, is referred to as a book document 9a (see FIG. 4, FIG. 5, FIG. 10).

Meanwhile, in a case where a thick document 9 such as the book document 9a is placed on the platen glass 15, in conventional image processing apparatuses, the platen cover 12 cannot be closed up to a position proximate to the platen glass 15. In the state where the platen cover 12 is away from the platen glass 15, the document conveyance path 122 of the platen cover 12 is away from the reading position P0 of the contact glass 14. In this case, the image reading portion 11 cannot execute the image reading process in the conveyance mode correctly.

As a result, in a case where the image reading process needs to be executed in the conveyance mode and the placement mode in series, the user has to do a troublesome work of performing individually an operation to execute the conveyance mode and an operation to execute the placement mode with an operation to remove the book document 9a from the platen glass 15 between the operations.

Furthermore, in a case where the copy process that includes the image reading process performed in the two modes in series, needs to be executed, it is necessary to do a more troublesome work of inserting sheets of copies obtained in the placement mode into sheets of copies obtained in the conveyance mode at target pages.

In addition, when a large gap is generated between the platen cover 12 and the platen glass 15, strong external light enters the image reading portion 11 from the gap. This may cause a noise to be generated in the image data D0 obtained by the image reading portion 11 due to the external light.

The image processing apparatus 10 has a configuration to prevent the platen cover 12 from lifting from the platen glass 15 when a thick document 9 such as the book document 9a is placed on the platen glass 15. The following describes the configuration.

Figure 3:
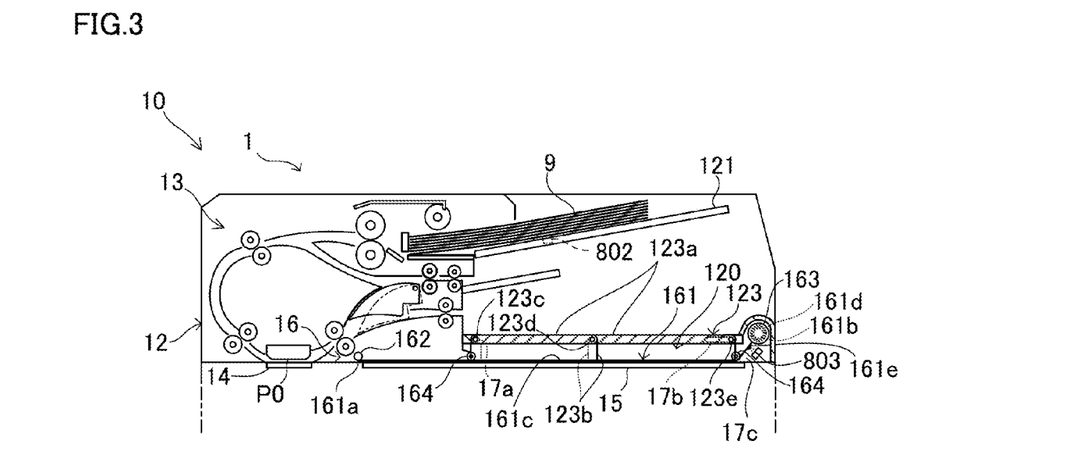
FIG. 3 is a configuration diagram of the cover portion of the image processing apparatus according to the first embodiment.
Figure 4:
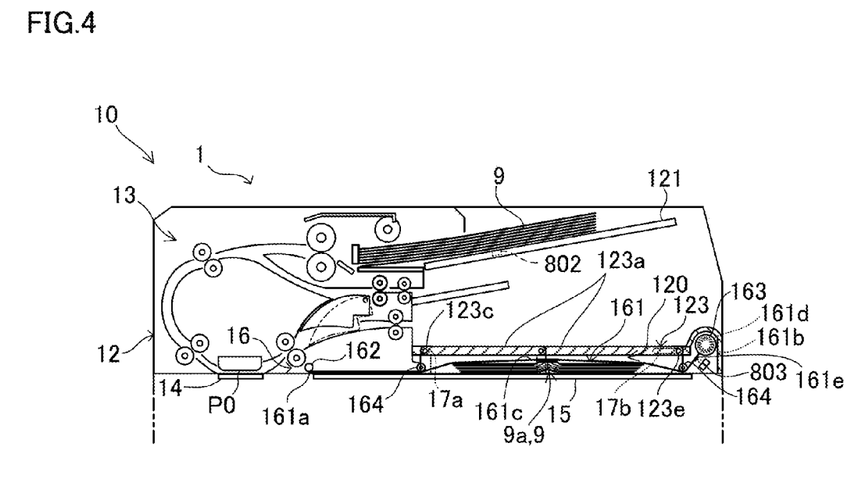
FIG. 4 is a configuration diagram of the cover portion pressing a relatively thin book document in the image processing apparatus according to the first embodiment.
Figure 5:
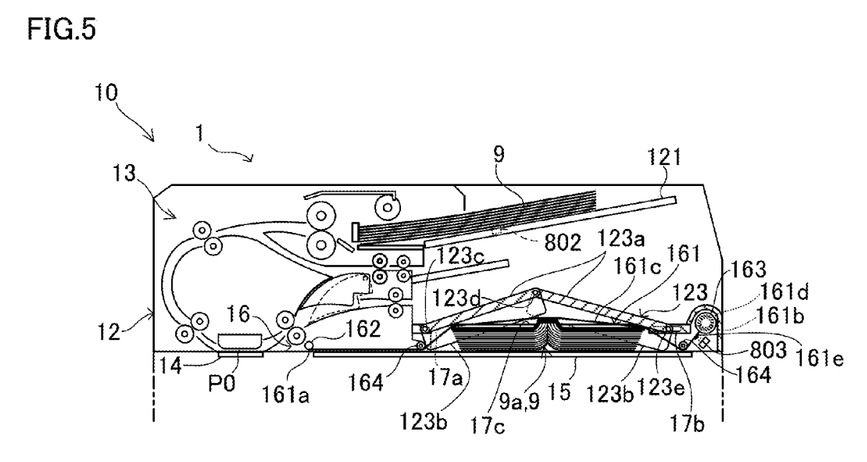
FIG. 5 is a configuration diagram of the cover portion pressing a relatively thick book document in the image processing apparatus according to the first embodiment.

As shown in FIG. 3 to FIG. 5, the image reading device 1 of the image processing apparatus 10 includes a document pressing portion 16 that includes a presser sheet 161 and a sheet winding portion 163 that are both provided in the platen cover 12.

The presser sheet 161 is a belt-like sheet configured to contact the document 9 placed on the platen glass 15 when the platen cover 12 is positioned at the closing position. A first end 161a, which is one of opposite ends of the presser sheet 161 in its longitudinal direction, is supported at a constant position by a support portion 162 of the platen cover 12.

The sheet winding portion 163 allows a first portion 161c, which is a part of the presser sheet 161, to extend along the platen glass 15 while holding a second portion 161d, which is another part of the presser sheet 161, in a wound state. The first portion 161c is a portion of the presser sheet 161 on the first end 161a side, and the second portion 161d is an end portion of the presser sheet 161 including a second end 161b. The second end 161b is an end of the presser sheet 161 opposite to the first end 161a.

The platen cover 12 rotatably supports a pair of tension rollers 164 at two positions along the platen glass 15. The pair of tension rollers 164 position the first portion 161c of the presser sheet 161 along the platen glass 15 by contacting opposite ends of the first portion 161c of the presser sheet 161 in its longitudinal direction.

The sheet winding portion 163 includes, for example, a well-known winding mechanism of a spiral spring type that is adopted in the winding measure or the like. In the sheet winding portion 163, the spiral spring applies an elastic force in a direction of winding the presser sheet 161, to a core member that winds the presser sheet 161.

The sheet winding portion 163 uses the elastic force of the spiral spring to allow the first portion 161c of the presser sheet 161 to extend along the platen glass 15 while keeping the second portion 161d of the presser sheet 161 to be wound by the core member that is not shown.

The sheet winding portion 163 is configured to feed the second portion 161d of the presser sheet 161 when an external force is applied to the first portion 161c of the presser sheet 161. The external force applied to the first portion 161c is a force in a direction of drawing out the second portion 161d of the presser sheet 161 from the sheet winding portion 163, namely, a force against the elastic force of the spiral spring.

In the platen cover 12, a retreat space 120 is formed so that the first portion 161c of the presser sheet 161 and the second portion 161d fed from the sheet winding portion 163 can retreat into the retreat space 120.

When the platen cover 12 is closed in a state where the book document 9a is placed on the platen glass 15, the first portion 161c of the presser sheet 161 contacts the book document 9a, receives a force from the book document 9a, and is pressed by the force that is greater than the elastic force in the direction of winding the spiral spring. This causes the sheet winding portion 163 to feed a part of the second portion 161d of the presser sheet 161, and the first portion 161c and the fed part of the second portion 161d are displaced to the retreat space 120 along the upper surface of the book document 9a.

In addition, the book document 9a is pressed against the platen glass 15 by the tensile force of the presser sheet 161. It is noted that in a case where an extremely thin document 9 is placed on the platen glass 15, the presser sheet 161 extends and presses the document 9 against the platen glass 15 while being in a flat state.

With the above-described configuration, at least one end portion of the presser sheet 161 is held by the sheet winding portion 163. This makes it possible to close the platen cover 12 completely even when the book document 9a is placed on the platen glass 15. That is, the configuration makes it possible to prevent a lift of the platen cover 12.

According to a conventional technique, when the image reading process is executed in the conveyance mode and the placement mode in series, the user has to do a troublesome work of executing individually the process of the conveyance mode and the process of the placement mode, and removing the book document 9a from the platen glass 15 before returning to the process of the conveyance mode. However, the above-described configuration eliminates the troublesome work of the user.

As shown in FIG. 3 to FIG. 5, the discharge tray 123 is formed at a position to face the presser sheet 161 via the retreat space 120. The discharge tray 123 is supported in such a way as to be displaced to a side opposite to the retreat space 120 when pressed by the presser sheet 161 that has retreated into the retreat space 120.

In the present embodiment, the discharge tray 123 has a link mechanism wherein two document receiving portions 123a are coupled with each other by a coupling shaft 123d. One document receiving portion 123a includes a support shaft 123c that is rotatably supported by a bearing portion 17a at an end opposite to the coupling shaft 123d, and the document receiving portion 123a can pivot around the support shaft 123c.

The other document receiving portion 123a includes a movable shaft 123e that is slidably supported by a slide support portion 17b at an end opposite to the coupling shaft 123d so as to be slidable along a document discharge direction.

Furthermore, the discharge tray 123 includes movable side wall portions 123b connected to opposite side edges of each document receiving portion 123a. In addition, fixed side wall portions 17c are formed at positions on the platen cover 12 that overlap the movable side wall portions 123b. The movable side wall portions 123b pivot in conjunction with the document receiving portions 123a. On the other hand, the fixed side wall portions 17c form walls that surround the retreat space 120 at constant positions on the platen cover 12.

In the platen cover 12, the entire peripheral of the retreat space 120 is surrounded by the presser sheet 161, the discharge tray 123, and partition wall portions including the fixed side wall portions 17c.

When the presser sheet 161 is displaced upward over the retreat space 120 along the upper surface of the thick book document 9a, the presser sheet 161 pushes the discharge tray 123 from the retreat space 120 side toward the opposite side, namely, from below to above.

Upon being pushed by the presser sheet 161 that has retreated into the retreat space 120, the discharge tray 123 is displaced to a side opposite to the retreat space 120. Specifically, the movable shaft 123e slides to be displaced, and the two document receiving portions 123a are displaced in a state of being bent at the coupling shaft 123d (see FIG. 5).

In the image processing apparatus 10, a gap through which external light enters the image reading portion 11, is not formed as far as the presser sheet 161 is displaced within the retreat space 120. As a result, it is possible to prevent a noise due to the external light from being generated in the image data D0 obtained by the image reading portion 11.

In addition, even in a case where the presser sheet 161 is displaced to such an extent as to push up the discharge tray 123, a gap through which external light enters, is minimized due to the action of the fixed side wall portions 17c that overlap the movable side wall portions 123b.

Since the discharge tray 123 is displaced in a direction of expanding the retreat space 120, even in a case where the thick book document 9a is placed on the platen glass 15, it is possible to prevent the platen cover 12 from lifting.

In addition, the image reading device 1 includes a feed sensor 803 configured to detect that the presser sheet 161 has been fed from the sheet winding portion 163. Hereinafter, a state where the feed sensor 803 has detected that the presser sheet 161 was fed from the sheet winding portion 163, is referred to as a feed detected state.

When the platen cover 12 is closed in a state where the book document 9a is placed on the platen glass 15, a part of the second portion 161d of the presser sheet 161 is fed from the sheet winding portion 163. Accordingly, it is also possible to say that the feed sensor 803 can detect whether or not the book document 9a is placed on the platen glass 15.

For example, the feed sensor 803 may be a photosensor that emits light to a reflection portion 161e stuck or applied to the presser sheet 161, and detects the reflection light. It is noted that the feed sensor 803 is an example of the feed detecting portion.

It is noted that the feed sensor 803 may be, for example, a photosensor that emits light to a hole formed in the presser sheet 161, and detects the reflection light. Use of the feed sensor 803 is described below.

[Control Portion 8]

Figure 6:
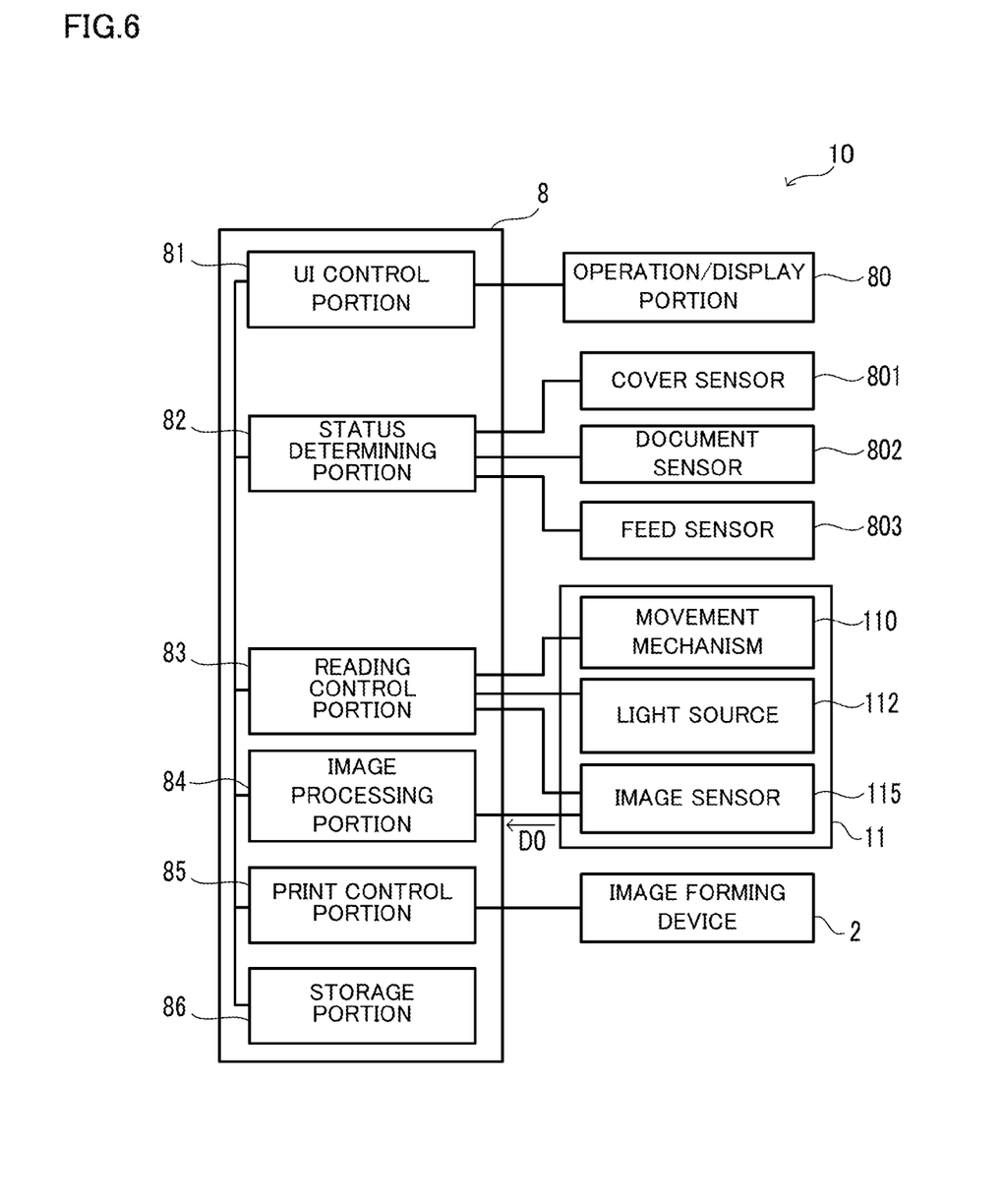
FIG. 6 is a block diagram of a control-related portion in the image processing apparatus according to the first embodiment.

As shown in FIG. 6, the control portion 8 includes a UI (User Interface) control portion 81, a state determining portion 82, a reading control portion 83, an image processing portion 84, a print control portion 85, and a non-transitory computer-readable storage portion 86.

For example, components of the control portion 8 other than the storage portion 86 may be composed of a processor such as a MPU (Micro Processor Unit) or a DSP (Digital Signal Processor), or a circuit such as an ASIC (Application Specific Integrated Circuit).

The storage portion 86 stores various types of data and programs that are referenced by the UI control portion 81, the state determining portion 82, the reading control portion 83, the image processing portion 84, and the print control portion 85. The MPU and the DSP include a RAM (Random Access Memory) that can temporarily store programs that perform data processing and data as the target of the data processing.

The UI control portion 81 controls the operation/display portion 80. The state determining portion 82 determines the state of the image reading device 1 based on the detection results of the cover sensor 801, the document sensor 802, and the feed sensor 803.

For example, the UI control portion 81 executes an ordinal position specification process by controlling the operation/display portion 80. The ordinal position specification process is executed to specify an ordinal position of the image reading process in the placement mode, in a case where the image reading process is executed in the conveyance mode and the placement mode in series.

In the ordinal position specification process, the UI control portion 81 sets an ordinal position of the image reading process in the placement mode, in accordance with a specification operation performed by the user on the operation/display portion 80. In the following description, a numeral that is specified in the ordinal position specification process as the ordinal position of the image reading process in the placement mode, is referred to as a specification number. It is noted that the UI control portion 81 is an example of the ordinal position specifying portion.

The ordinal position specification process is executed in accordance with an operation of the user before the image reading process is executed in a state where documents 9 are placed on both the supply tray 121 and the platen glass 15. When the specification number is specified, the image reading portion 11 executes the image reading process in an insertion mode.

The image reading process in the insertion mode includes the image reading process in the conveyance mode and the image reading process in the placement mode. More specifically, during the image reading process in the insertion mode, the image reading portion 11 executes in succession: a process of reading an image from a sheet of document in the conveyance mode at each ordinal position other than the ordinal position specified by the specification number; and a process of reading an image from a document in the placement mode at the ordinal position specified by the specification number.

For example, suppose that 3 (three) is specified as the specification number in a state where five sheets of documents 9 are placed on the supply tray 121 and the book document 9a is placed on the platen glass 15. In this case, the image reading portion 11 executes the image reading process in the conveyance mode with respect to the first and second sheets of document 9 on the supply tray 121, and then executes the image reading process in the placement mode with respect to the book document 9a, and then executes the image reading process in the conveyance mode with respect to the remaining sheets of documents 9 on the supply tray 121. This is an example of the image reading process in the insertion mode.

The reading control portion 83 controls the image reading portion 11, and the image processing portion 84 executes a process of calculating the image data D0 obtained from the image sensor 115, namely, executes the image processing. The print control portion 85 controls the image forming device 2.

[Scan Control]

Figure 7:
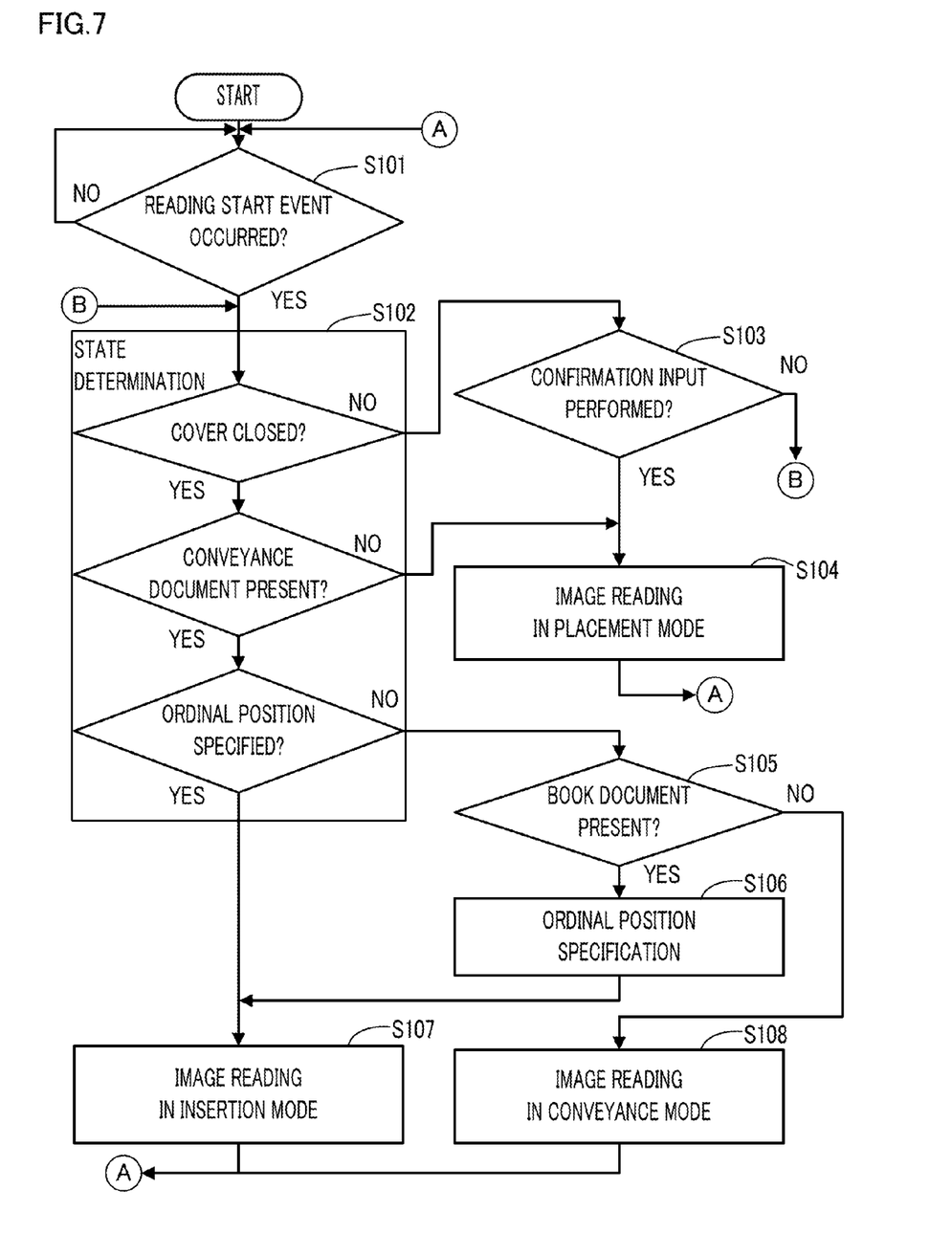
FIG. 7 is a flowchart showing an example of procedures of a scan control executed by a control portion in the image processing apparatus according to the first embodiment.

Next, an example of the procedures of a scan control executed by the control portion 8 is described with reference to the flowchart shown in FIG. 7. In the following description, S101, S102, . . . are identification signs representing the steps executed by the control portion 8.

<Step S101>

In the scan control, first the UI control portion 81 determines whether or not a predetermined reading start event has occurred, and waits until the reading start event occurs.

For example, the reading start event may be an operation of a start button 80a provided on the operation/display portion 80 (see FIG. 2).

<Step S102>

When the UI control portion 81 determines that the reading start event has occurred, the state determining portion 82 executes a cover closure determination, a conveyance document presence/absence determination, and an ordinal position specification determination, as the processes for determining the state of the image reading device 1.

The cover closure determination is a process to determine whether or not the platen cover 12 is present at the closing position, based on the detection result of the cover sensor 801. The conveyance document presence/absence determination is a process to determine whether or not the document 9 is present on the supply tray 121, based on the detection result of the document sensor 802. The ordinal position specification determination is a process to determine whether or not the specification number has been specified in advance in the ordinal position specification process.

Upon determining that the platen cover 12 is not present at the closing position, the state determining portion 82 moves the process to step S103. In addition, upon determining that the platen cover 12 is present at the closing position and the document 9 is not present on the supply tray 121, the state determining portion 82 moves the process to step S104.

In addition, upon determining that the platen cover 12 is present at the closing position, that the document 9 is present on the supply tray 121, and that the specification number has not been specified in advance, the state determining portion 82 moves the process to step S105.

In addition, upon determining that the platen cover 12 is present at the closing position, that the document 9 is present on the supply tray 121, and that the specification number has been specified in advance, the state determining portion 82 moves the process to step S107.

<Step S103>

In step S103, the UI control portion 81 determines whether or not a confirmation input operation has been performed on the operation/display portion 80 to permit the image reading process to be executed in the present state.

The UI control portion 81 then repeats the processes of steps S102 and S103 until it is determined that the platen cover 12 is present at the closing position, or it is determined that the confirmation input operation has been performed.

Upon determining that the platen cover 12 is not present at the closing position, and that the confirmation input operation has been performed, the UI control portion 81 moves the process to step S104.

<Step S104>

In step S104, the image reading portion 11 executes the image reading process in the placement mode under the control of the reading control portion 83. In addition, in a case where the copy mode has been selected in advance, the print control portion 85, in step S104, causes the image forming device 2 to execute a print process to form, on a sheet 90, an image represented by the image data D0 obtained in the image reading process in the placement mode. After the execution of the process of step S104, the processes from step S101 are repeated.

As described above, the process of step S104 is executed when any of the following two types of detection results is obtained. One of the detection results is that the platen cover 12 is not present at the closing position and the confirmation input operation has been performed. The other detection result is that the platen cover 12 is present at the closing position and a document 9 is not present on the supply tray 121.

<Step S105>

In step S105, the status determining portion 82 determines whether or not the feed sensor 803 is in the feed detected state, namely, whether or not the book document 9a is present on the platen glass 15.

Upon determining that the feed sensor 803 is in the feed detected state, the status determining portion 82 moves the process to step S106, and otherwise, moves the process to step S108.

As described above, the process of step S105 is executed when it is determined that the platen cover 12 is present at the closing position, that the document 9 is present on the supply tray 121, and that the specification number has not been specified in advance.

<Step S106>

In step S106, the UI control portion 81 executes the ordinal position specification process by controlling the operation/display portion 80. For example, when the user has forgotten to specify the specification number in advance, the UI control portion 81 urges the user to specify the specification number. After step S106, the UI control portion 81 moves the process to step S107.

<Step S107>

In step S107, the image reading portion 11 executes the image reading process in the insertion mode in accordance with a control performed by the reading control portion 83. In addition, when the copy mode has been selected in advance, in step S107, the print control portion 85 causes the image forming device 2 to execute a print process to form, on a sheet 90, an image represented by the image data D0 obtained in the image reading process in the insertion mode.

With execution of the process of step S107 in the copy mode, sheets of copies of the documents 9 placed on the supply tray 121 and the platen glass 15 are obtained, and sheets of copies of the document 9 placed on the platen glass 15 are automatically inserted at a position (page) specified by the specification number. After execution of the process of step S107, the processes from step S101 are repeated.

It is noted that in the ordinal position specification process, the head page (position) or the last page (position) may be specified as the specification number.

As described above, the process of step S107 is executed when the specification number has been specified in the ordinal position specification process before the reading start event occurs, or in the ordinal position specification process in step S106.

According to the image processing apparatus 10, even when the book document 9a is placed on the platen glass 15, the platen cover 12 can pivot to the closing position. As a result, the user does not need to remove the book document 9a from the platen cover 12 during execution of the image reading process in the insertion mode. Accordingly, the user's operation becomes easy when the image reading process is executed in the conveyance mode and the placement mode in series.

<Step S108>

In step S108, the image reading portion 11 executes the image reading process in the conveyance mode under the control of the reading control portion 83. In addition, when the copy mode has been selected in advance, in step S108, the print control portion 85 causes the image forming device 2 to execute a print process to form, on a sheet 90, an image represented by the image data D0 obtained in the image reading process in the conveyance mode. After the process of step S108, the processes from step S101 are repeated.

As described above, the process of step S108 is executed when it is determined that the platen cover 12 is present at the closing position, that the specification number has not been specified in advance, and that the feed sensor 803 is not in the feed detected state.

In addition, the image processing portion 84 performs a book document processing control during the image reading process executed in step S104, and during the image reading process in the placement mode that is executed as a part of the image reading process in the insertion mode in step S107.

The book document processing control is performed to determine whether or not to execute, on the image data D0, a special book document processing for the book document 9a, depending on whether or not the image data D0 obtained from the document 9 on the platen glass 15 was obtained when the feed sensor 803 was in the feed detected state. A concrete example of the book document processing is described below.

[Book Document Processing Control]

In the following, an example of the procedures of the book document processing control executed by the image processing portion 84 is described with reference to the flowchart shown in FIG. 8. In the following description, S201, S202, . . . are identification signs representing the steps executed by the image processing portion 84.

<Step S201>

When the image reading portion 11 obtains the image data D0 from the document 9 on the platen glass 15, the image processing portion 84 executes predetermined common image processing on the image data D0.

The common image processing is image processing that is commonly executed on the image data D0 regardless of the type of the document 9.

<Step S202>

Furthermore, the image processing portion 84 determines whether or not the image data D0 obtained from the document 9 on the platen glass 15 was obtained when the feed sensor 803 is in the feed detected state. It is noted that the image data D0 obtained from the document 9 on the platen glass 15 was obtained in the image reading process in the placement mode in step S104 or S107.

Upon determining that the image data D0 obtained from the document 9 on the platen glass 15 was obtained when the feed sensor 803 is in the feed detected state, the image processing portion 84 executes the book document processing in step S203, and otherwise, ends the book document processing control.

<Step S203>

In step S203, the image processing portion 84 executes the book document processing on the image data D0 obtained from the document 9 on the platen glass 15. Thereafter, the image processing portion 84 ends the book document processing control.

In the book document processing, the image processing portion 84 executes a predetermined process on data of a central area in a coordinate axis direction (x-axis direction or y-axis direction) in the image data D0, the predetermined process being different from a process executed on data of the other areas.

The central area corresponds to a boundary portion between two pages of the center spread in the book document 9a. For example, the image processing portion 84 determines whether the center spread of the book document 9a extends in the x-axis direction or in the y-axis direction by comparing a candidate for the central area in the x-axis direction and a candidate for the central area in the y-axis direction with regard to a ratio of an area occupied by a shadow image to the entire area.

The shadow image is a gray image that is approximate to a black image in a predetermined range. In general, the central area in the image data D0 obtained from the book document 9a has a high ratio of the shadow image.

For example, in the book document processing, the image processing portion 84 replaces the shadow image data in the central area with base image data that is detected from the other areas.

In addition, in the book document processing, when the central area includes character images, the image processing portion 84 may execute a distortion correcting process to correct a distortion of the character images.

In general, the character image in the central area of the image data D0 obtained from the book document 9a is distorted. Specifically, the closer to the boundary line, between two pages of the center spread, the character image is, the narrower the width of the character image is in a direction perpendicular to the boundary line. In the distortion correcting process, a portion of the character image close to the boundary line is stretched in the direction perpendicular to the boundary line.

As described above, the image processing portion 84 executes the book document processing in a case where the image data D0 of the document 9 on the platen glass 15 has been obtained by the image reading portion 11 in a state where the feed sensor 803 detected that the presser sheet 161 had been fed from the sheet winding portion 163.

In other words, the image processing portion 84 selects whether to execute the book document processing on the image data D0, depending on whether the image data D0 read from the document 9 on the platen glass 15 was obtained when the feed sensor 803 was in the feed detected state.

With the book document processing control, the book document processing suitable for the book document 9a is automatically executed based on the detection result of the feed sensor 803.

[Second Embodiment]

Figure 9:
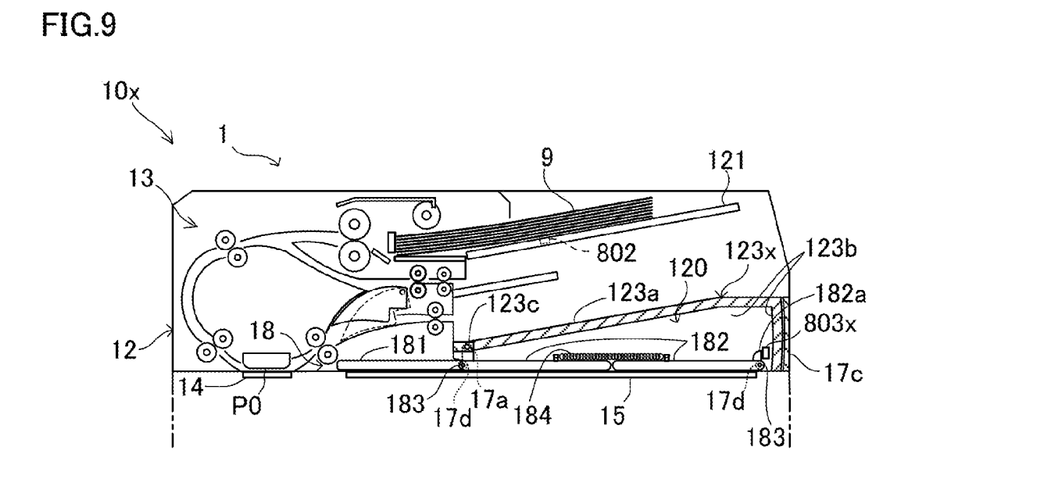
FIG. 9 is a configuration diagram of the cover portion of the image processing apparatus according to a second embodiment.
Figure 10:
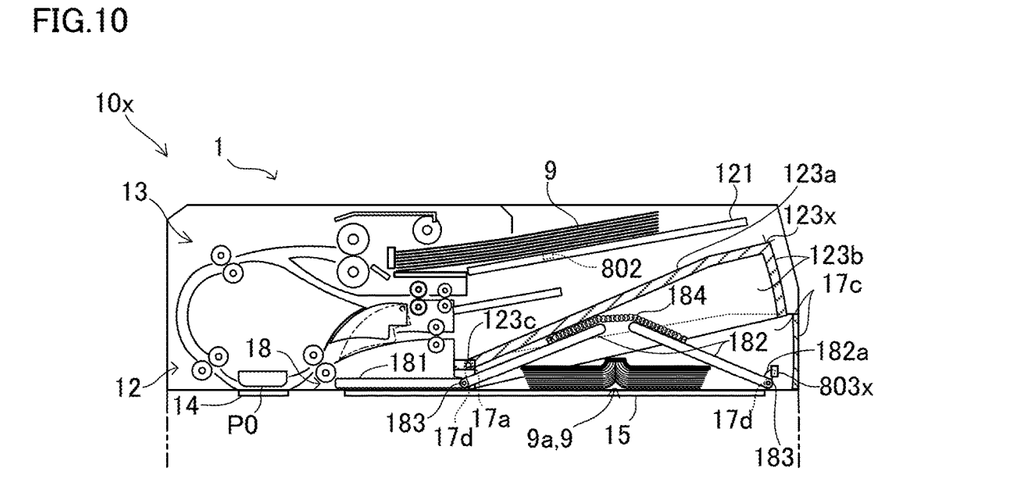
FIG. 10 is a configuration diagram of the cover portion pressing a thick book document in the image processing apparatus according to the second embodiment.

Next, a description is given of an image processing apparatus 10x according to the second embodiment with reference to FIG. 9 and FIG. 10. In FIG. 9 and FIG. 10, the same components as those shown in FIG. 1 to FIG. 8 are assigned the same reference signs. The following describes the difference of the image processing apparatus 10x from the image processing apparatus 10.

Compared to the image processing apparatus 10 shown in FIG. 1 to FIG. 8, the image processing apparatus 10x includes, in place of the document pressing portion 16 and the discharge tray 123, a document pressing portion 18 and a discharge tray 123x that have different structures from the document pressing portion 16 and the discharge tray 123, respectively.

The document pressing portion 18 is, as is the case with the document pressing portion 16, provided in the platen cover 12. The document pressing portion 18 includes a plurality of panel portions 181 and 182 that press the document 9 on the platen glass 15. In the present embodiment, the document pressing portion 18 includes one fixed panel portion 181 and two movable panel portions 182.

The fixed panel portion 181 is supported by the platen cover 12 at a constant position along the platen glass 15. The two movable panel portions 182 are supported by the platen cover 12 to be at a reference position along the platen glass 15 such that they are displaced from the reference position into the retreat space 120 formed in the platen cover 12 when an external force is applied from the platen glass 15 side.

FIG. 9 shows a state where the two movable panel portions 182 are positioned at the reference position. FIG. 10 shows a state where the two movable panel portions 182 have been displaced from the reference position into the retreat space 120.

The fixed panel portion 181 and the two movable panel portions 182 positioned at the reference position are flush with each other along the platen glass 15. At least a part of the fixed panel portion 181 is closer to the ADF 13 than to the discharge tray 123*x*. On the other hand, the two movable panel portions 182 are disposed to face the discharge tray 123*x*. The retreat space 120 is a space that is present between the two movable panel portions 182 and the discharge tray 123*x*.

The two movable panel portions 182 includes, respectively, support shafts 123*c* that are rotatably supported by bearing portions 17*d* at opposite ends respectively, and the two movable panel portions 182 can pivot around the support shafts 123*c*, respectively.

As shown in FIG. 10, upon contacting the book document 9*a* placed on the platen glass 15, the two movable panel portions 182 receive pressures from the book document 9*a*, and are pivoted and displaced into the retreat space 120.

In the image processing apparatus 10*x*, the two movable panel portions 182 play the same role as the presser sheet 161 in the image processing apparatus 10. As a result, as is the case with the image processing apparatus 10, the image processing apparatus 10*x* prevents the platen cover 12 from lifting when the book document 9*a* is placed on the platen glass 15.

In addition, in the present embodiment, the document pressing portion 18 includes a spring 184 which is an elastic member whose opposite ends are coupled with the two movable panel portions 182, respectively. The spring 184 applies an elastic force that holds the two movable panel portions 182 at the reference position.

The two movable panel portions 182 press the document 9 against the platen glass 15 by a pressure that is greater due to the elastic force of the spring 184, than a load applied by the two movable panel portions 182. In addition, the spring 184 applies to the two movable panel portions 182 a force that allows the document 9 that is easy to lift from the platen glass 15, such as a folded sheet(s) of document 9 or the book document 9*a*, to be in close contact with the platen glass 15.

In addition, when the two movable panel portions 182 contact a thick book document 9*a* and are displaced upward over the retreat space 120, they push the discharge tray 123*x* from the retreat space 120 side toward the opposite side, namely, from below to above.

The discharge tray 123*x* includes a document receiving portion 123*a* and movable side wall portions 123*b*. The document receiving portion 123*a* includes a support shaft 123*c* that is rotatably supported by a bearing portion 17*a* formed in the platen cover 12, and the document receiving portion 123*a* can pivot around the support shaft 123*c*.

In addition, the movable side wall portions 123*b* that are disposed on the opposite sides of the document receiving portions 123*a*, pivot integrally with the document receiving portions 123*a*. The fixed side wall portions 17*c* formed on the platen cover 12 overlap the movable side wall portions 123*b* and form walls that surround the retreat space 120.

In the platen cover 12 of the image processing apparatus 10*x*, the retreat space 120 is a space whose entire peripheral is surrounded by the two movable panel portions 182, the discharge tray 123*x*, and partition wall portions including the fixed side wall portions 17*c*.

Upon receiving a force greater than the load from the retreat space 120 side, the discharge tray 123*x* pivots to a side opposite to the retreat space 120, namely, pivots upward.

As a result, when a thick book document 9*a* is placed, the discharge tray 123*x* is pushed by the two movable panel portions 182 that have retreated into the retreat space 120, and is displaced to a side opposite to the retreat space 120 (see FIG. 10).

Since the discharge tray 123*x* can be displaced in a direction of expanding the retreat space 120, even in a case where the thick book document 9*a* is placed on the platen glass 15, it is possible to prevent the platen cover 12 from lifting.

In addition, even in a case where the two movable panel portions 182 are displaced to such an extent as to push up the discharge tray 123*x*, a gap through which external light enters is minimized due to the action of the fixed side wall portions 17*c* that overlap the movable side wall portions 123*b*.

The image reading portion 11 of the image processing apparatus 10*x*, as is the case with the image reading portion 11 of the image processing apparatus 10, can read the document image in the placement mode, the conveyance mode, and the insertion mode. It is noted that the image reading process in the insertion mode is executed when the specification number is specified.

In addition, the image reading device 1 includes a displacement sensor 803*x* that detects a displacement of the two movable panel portions 182 from the reference position into the retreat space 120. In the following description, a state where a displacement of the two movable panel portions 182 into the retreat space 120 has been detected by the displacement sensor 803*x* is referred to as a displacement detected state. It is noted that the displacement sensor 803*x* is an example of the displacement detecting portion.

When the platen cover 12 is closed in a state where the book document 9*a* is placed on the platen glass 15, the two movable panel portions 182 are pushed by the book document 9*a* and displaced into the retreat space 120. Accordingly, it is also possible to say that the displacement sensor 803*x* is a sensor configured to detect whether or not the book document 9*a* is placed on the platen glass 15.

For example, the displacement sensor 803*x* may be a photosensor that can detect whether or not a light blocking portion 182*a* formed on one of the two movable panel portions 182 blocks light. The light blocking portion 182*a*, in conjunction with the displacement of the panel portion 182, is displaced between: a position where it blocks the light emitted from the photosensor; and a position where it does not block the light. In the image processing apparatus 10*x*, the displacement sensor 803*x* plays the same role as the feed sensor 803 of the image processing apparatus 10.

The image processing portion 84 of the image processing apparatus 10*x*, as is the case with the image processing portion 84 of the image processing apparatus 10, executes the book document processing when the image data D0 of the document 9 on the platen glass 15 has been obtained by the image reading portion 11 in a state where the displacement sensor 803x has detected that the two movable panel portions 182 were displaced into the retreat space 120.

As understood from the above description, the image processing apparatus 10x produces substantially the same effect as the image processing apparatus 10.

[Application Examples]

Figure 8:
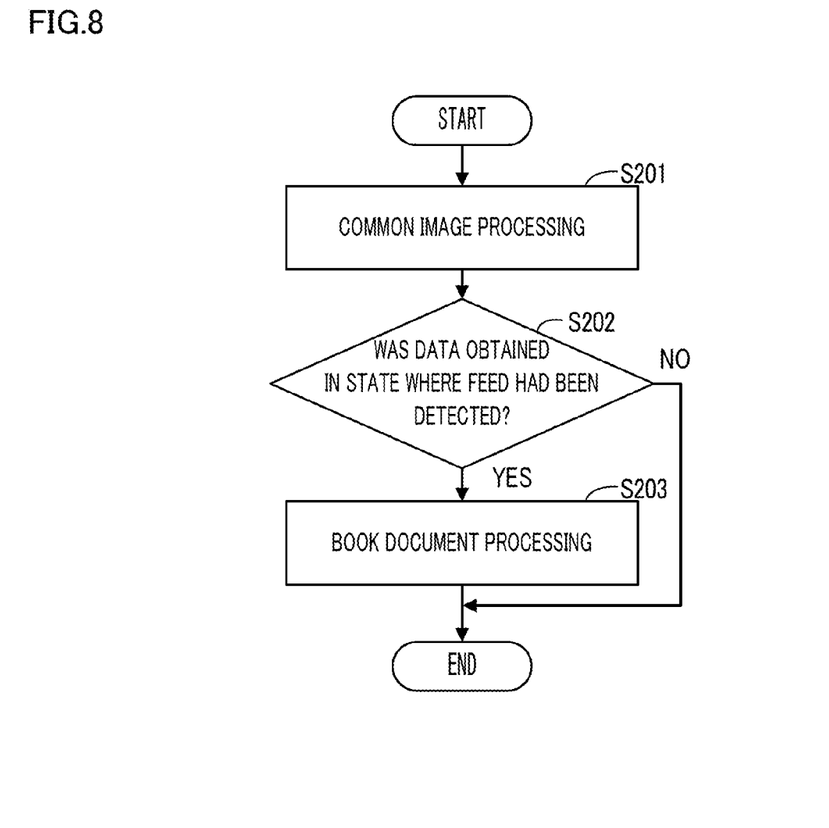
FIG. 8 is a flowchart showing an example of procedures of a book document processing control executed by an image processing portion in the image processing apparatus according to the first embodiment.

In the image processing apparatus 10 shown in FIG. 3 to FIG. 5, the discharge tray 123x of the image processing apparatus 10x shown in FIG. 8 and FIG. 9 may be adopted. In addition, in the image processing apparatus 10x shown in FIG. 8 and FIG. 9, the discharge tray 123 of the image processing apparatus 10 shown in FIG. 3 to FIG. 5 may be adopted.

In the image processing apparatus 10x, the two movable panel portions 182 may have the same link mechanism as the two document receiving portions 123a of the discharge tray 123 in the image processing apparatus 10. In this case, too, the two movable panel portions 182 can be displaced into the retreat space 120.

In the document pressing portion 18 of the image processing apparatus 10x, one of the two movable panel portions 182 may be omitted, and a movable panel portion 182 having the same length as the two movable panel portions 182 may be pivotably supported.

It is noted that the image processing apparatus of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
a document table on which a document is placed;
an image reader configured to read an image from the document placed on the document table;
a cover portion supported in such a way as to pivot between a closing position to cover the document table and an opening position to open a space on the document table;
a presser sheet of a belt-like shape provided on the cover portion and configured to contact the document on the document table when the cover portion is positioned at the closing position;
a sheet winder provided on the cover portion and configured to allow a first portion to extend along the document table while holding a second portion in a wound state, and feed the second portion when an external force is applied to the first portion, the first portion being a part of the presser sheet, the second portion being another part of the presser sheet including an end of the presser sheet, and
a document conveyor provided in the cover portion and configured to convey each document from a supply tray formed on the cover portion to a discharge tray via a document conveyance path, wherein
in the cover portion, a retreat space is formed so that the first portion of the presser sheet and a portion of the second portion fed from the sheet winder are configured to retreat into the retreat space, and
the image reader is configured to read an image from a document in a placement mode in which to read the image from the document placed on the document table, and in a conveyance mode in which to read the image from the document conveyed along the document conveyance path.

2. The image processing apparatus according to claim 1, wherein
the discharge tray is formed at a position to face the presser sheet via the retreat space, and is supported in such a way as to be displaced toward a side opposite to the retreat space when being pressed by the presser sheet that has retreated into the retreat space.

3. The image processing apparatus according to claim 1, further comprising:
an ordinal positioner configured to specify an ordinal position for a process of reading an image from a document in the placement mode, in a case where the process of reading an image from a document is executed in the conveyance mode and the placement mode in series, wherein
after the ordinal positioner specifies the ordinal position, the image reader executes in succession: the process of reading an image from a document in the conveyance mode at each ordinal position other than the ordinal position specified by the ordinal positioner; and the process of reading an image from a document in the placement mode at the ordinal position specified by the ordinal positioner.

4. An image processing apparatus comprising:
a document table on which a document is placed;
an image reader configured to read an image from the document placed on the document table;
a cover portion supported in such a way as to pivot between a closing position to cover the document table and an opening position to open a space on the document table;
a presser sheet of a belt-like shape provided on the cover portion and configured to contact the document on the document table when the cover portion is positioned at the closing position;
a sheet winder provided on the cover portion and configured to allow a first portion to extend along the document table while holding a second portion in a wound state, and feed the second portion when an external force is applied to the first portion, the first portion being a part of the presser sheet, the second portion being another part of the presser sheet including an end of the presser sheet;
a feed sensor configured to detect that the presser sheet has been fed from the sheet winder; and
an image processor configured to process data of a document image read by the image reader, wherein
in the cover portion, a retreat space is formed so that the first portion of the presser sheet and a portion of the second portion fed from the sheet winder are configured to retreat into the retreat space,
the image processor is configured to execute a book document processing in which to perform a predetermined process on image data of a central area in one of two coordinate axis directions in the data of the document image, the predetermined process being different from a process executed on image data of other areas, and the image processor executes the book document processing in a case where the data of the document image of the document on the document table has been obtained by the image reader in a state where the feed sensor has detected that the presser sheet was fed from the sheet winder.

5. An image processing apparatus comprising:
a document table on which a document is placed;
an image reader configured to read an image from the document on the document table;
a cover portion supported in such a way as to pivot between a closing position to cover the document table and an opening position to open a space on the document table;
a document pressing portion provided on the cover portion and including at least one panel portion that presses the document on the document table; and
a document conveyor provided in the cover portion and configured to convey each document from a supply tray formed on the cover portion to a discharge tray via a document conveyance path, wherein
the panel portion is supported by the cover portion to be at a reference position along the document table so that the panel portion is configured to be displaced into a retreat space formed in the cover portion from the reference position when an external force is applied from a document table side, and
the image reader is configured to read the image of the document in a placement mode in which to read the image from the document placed on the document table, and in a conveyance mode in which to read the image from the document conveyed along the document conveyance path.

6. The image processing apparatus according to claim 5, wherein
the discharge tray is formed at a position to face the panel portion via the retreat space, and is supported in such a way as to be displaced toward a side opposite to the retreat space when being pressed by the panel portion that has retreated into the retreat space.

7. The image processing apparatus according to claim 5, further comprising:
an ordinal positioner configured to specify an ordinal position for a process of reading an image from a document in the placement mode, in a case where the process of reading an image from a document is executed in the conveyance mode and the placement mode in series, wherein
after the ordinal positioner specifies the ordinal position, the image reader executes in succession: the process of reading an image from a document in the conveyance mode at each ordinal position other than the ordinal position specified by the ordinal positioner; and the process of reading an image from a document in the placement mode at the ordinal position specified by the ordinal positioner.

8. An image processing apparatus comprising:
a document table on which a document is placed;
an image reader configured to read an image from the document on the document table;
a cover portion supported in such a way as to pivot between a closing position to cover the document table and an opening position to open a space on the document table;
a document pressing portion provided on the cover portion and including at least one panel portion that presses the document on the document table;
a displacement sensor configured to detect that the panel portion of the document pressing portion has been displaced into a retreat space from a reference position; and
an image processor configured to process data of a document image read by the image reader, wherein
the panel portion is supported by the cover portion to be at the reference position along the document table so that the panel portion is configured to be displaced into the retreat space formed in the cover portion from the reference position when an external force is applied from a document table side,
the image processor is configured to execute a book document processing in which to perform a predetermined process on image data of a central area in one of two coordinate axis directions in the data of the document image, the predetermined process being different from a process executed on image data of other areas, and
the image processor executes the book document processing in a case where the data of the document image of the document on the document table has been obtained by the image reader in a state where the displacement sensor has detected that the panel portion was displaced into the retreat space.

* * * * *

UNITED STATES PATENT AND TRADEMARK OFFICE
CERTIFICATE OF CORRECTION

PATENT NO. : 10,015,336 B2
APPLICATION NO. : 15/445825
DATED : July 3, 2018
INVENTOR(S) : Yoshihiro Ando, Saki Katayama and Masuo Kawamoto It is certified that error appears in the above-identified patent and that said Letters Patent is hereby corrected as shown below:

On the Title Page

Item (30), Foreign Application Priority Data, delete "Mar. 7, 2017" and insert --Mar. 29, 2016--

Signed and Sealed this
Eighteenth Day of September, 2018

Andrei Iancu
*Director of the United States Patent and Trademark Office*